United States Patent

Meyer-Wittreck et al.

Patent Number: 6,027,020
Date of Patent: Feb. 22, 2000

[54] SYSTEM FOR PROCESSING CHIP AND/OR MAGNETIC STRIPE CARDS

[75] Inventors: Udo Meyer-Wittreck, Rietberg; Hermann Ruebbelke, Delbrueck; Frank Krupke, Soest; Steffen Roebke, Paderborn, all of Germany

[73] Assignee: Orga Kartensysteme GmbH, Paderborn, Germany

[21] Appl. No.: 09/035,853

[22] Filed: Mar. 6, 1998

[30] Foreign Application Priority Data

Mar. 8, 1997 [DE] Germany ............................ 197 09 562

[51] Int. Cl.⁷ ...................................................... G06F 7/08
[52] U.S. Cl. ............................ 235/381; 235/377; 235/475; 235/492; 235/493
[58] Field of Search ........................... 235/381, 375, 235/376, 377, 380, 435, 439, 440, 449, 451, 452, 474, 475, 476, 478, 492, 493

[56] References Cited

U.S. PATENT DOCUMENTS

| | | | |
|---|---|---|---|
| 4,825,054 | 4/1989 | Rust et al. | 235/380 |
| 4,851,651 | 7/1989 | Gaucher | 235/380 |
| 4,866,259 | 9/1989 | Bonnemoy | 235/475 |
| 4,900,906 | 2/1990 | Pusic | 235/381 |
| 5,010,239 | 4/1991 | Mita | 235/441 |
| 5,483,050 | 1/1996 | Fukasawa | 235/449 |
| 5,814,796 | 9/1998 | Benson et al. | 235/375 |
| 5,837,991 | 11/1998 | LaManna et al. | 235/475 |
| 5,920,055 | 7/1999 | Roth et al. | 235/380 |

FOREIGN PATENT DOCUMENTS 3049607 7/1982 Germany .
87/01232 2/1987 WIPO .

OTHER PUBLICATIONS

ORGA, "The Smart Card Integrator", Overview of personalisation systems * month & year missing.
ORGA, "Electronic Praxis", (1995), pp. 108 * month missing.

*Primary Examiner*—Michael G Lee
*Attorney, Agent, or Firm*—Foley & Lardner

[57] ABSTRACT

A system for processing chip and/or magnetic strip cards (K), comprising at least one card supply magazine for accommodating cards to be processed; at least a chip and/or magnetic stripe processing station for applying data/information on the chip and/or the magnetic stripe of the cards (I), with a certain chip and/or magnetic stripe processing time being associated with the station; at least one card body processing station for applying data/information on the card body, with a certain card body processing time being associated with the station; a card transport system which transports the cards from the card supply magazine to the chip and/or magnetic stripe processing station and subsequently to the card body processing stations and from these onwards, wherein the processing time of the at least one chip and/or magnetic stripe processing station differs from the processing time of the at least one card body processing station, and the card transport time from the card supply magazine to one of the processing stations as well as the card transport time from one of the processing stations to another of the processing stations is shorter than a processing time of the processing station with the longest processing time; wherein there are a first number of the processing stations with approximately the longest processing time, which first number is greater than the number of the processing stations with the shortest processing time.

39 Claims, 18 Drawing Sheets

SYSTEM FOR PROCESSING CHIP AND/OR MAGNETIC STRIPE CARDS

BACKGROUND OF THE INVENTION

The invention relates to a system for processing chip and/or magnetic stripe cards, i.e., to a so called card personalization system. With such a system on the one hand card/userspecific data is recorded on the chip (semiconductor module) and/ or the magnetic stripe, and on the other hand card/user specific data is applied on the card body. For this purpose such a system comprises a chip and/or magnetic stripe processing station in which the chip and, if required, magnetic stripe processing is integrated in a known manner with a card body processing station. While the data recorded on the chip or the magnetic stripe, respectively, can generally be changed because the corresponding storage media can be written several times, the data applied on the card body cannot be changed. The unchangeable data is applied to the card body, for example, by laser inscription, by thermal transfer printing, or by embossing. The size of these cards is standardized by international standards (see ISO 7810).

A system of this type is, for example, known from DE 30 49 607. In this system the cards which have been removed from a card supply magazine which contains the cards to be processed, successively first travel through the chip and/or magnetic stripe processing station where the changeable data is recorded and then through the card body processing station where the unchangeable data is applied. After the recording of data on the chip and/or the magnetic stripe it is checked whether the recording has been effected properly. This can be done in the chip and/or the magnetic stripe processing station or in a separate inspection station. Cards on which data recording on the chip and or magnetic stripe was not carried out properly will not be supplied to the card body processing station where the unchangeable data is applied. Those cards are rejected. A problem of such a system, however, is the card throughput because the processing times in the chip and/or the magnetic stripe processing station and in the card body processing station differ from each other considerably. A typical example: Processing time for data recording on a microprocessor chip is approximately 20 sec; processing time for the application of alphanumerical characters by laser inscription on a card body is approximately 6 s. The slow "chip personalization" limits the card throughput.

Another system is known from EP 0 256 921. This system, however, permits the recording of data only on the chip and/or the magnetic stripe and not the application of unchangeable data on the card body. This system therefore comprises only one type of processing station provided the chip and magnetic stripe processing is considered integrated in one processing station. Due to the fact that the recording of data in a chip and/or magnetic stripe processing station takes much more time than the time for removing a card from the card supply magazine, for the transport of this card to the chip and/or magnetic stripe processing station and the transfer of this card from this same system, multiple of these chip and/or magnetic stripe processing stations are provided, i.e., while the card first transported is being processed in a chip and/or magnetic stripe processing station, the next chip and/or magnetic stripe processing stations are already filled and so on. For this purpose the system comprises several chip and/or magnetic stripe processing stations arranged side by side. A gripper which can be linearly moved in front of these stations removes cards to be processed from the card supply magazine, carries them to the chip and/or magnetic stripe processing stations and inserts them into same whereby the chip and/or magnetic stripe processing stations are successively filled. When a card is completed the gripper pulls that card out of the chip and/or magnetic stripe processing station and carries it to a storage magazine. For the application of unchangeable data on the card body, e.g., by laser inscription, the cards would have to be removed from the storage magazine and supplied to another system.

Furthermore, a system developed by the applicant is known (see Brochure HSP4000), which comprises both a chip and/or magnetic stripe processing station and a card body processing station in the form of a laser inscription station. Therein, four chip and/or magnetic stripe processing stations are provided, while only one laser station is provided. This accounts for the fact that the recording of data on the chip and/or magnetic stripe takes considerably longer than the laser inscription on the card body. In this system the cards to be processed are removed from the card supply magazine by means of a robot arm, equipped with a suction cup, subsequently carried to a chip and/or magnetic stripe processing station by the robot arm, and transferred to the processing station. After data recording on the chip and/or the magnetic stripe the cards are removed from the chip and/or magnetic stripe processing station by the robot arm and then supplied to the laser station. After completion of the laser inscription on a card, the card is removed from the laser station by the robot arm and placed into a storage magazine. Compared to the system according to the above mentioned EP 0 256 921, this system though comprising the multiple slow chip and/or magnetic stripe processing stations and one card body processing station for the application of unchangeable data on the card body, does nevertheless not enable an increase in the card through put which is required because of the ever increasing demand for cards, due to its design. The robot arm with its three dimensional motions requires a significant amount of space, which again results in correspondingly long card transport travels and times. In addition, the control of such a robot arm is relatively sophisticated and also time consuming. This imparts limits on the extension of parallel processing through the addition of several chip and/or magnetic stripe processing stations because this system cannot supply cards to these additional stations. Even in the case that the processing time of the chip and/or magnetic stripe processing station, which is slow compared to the laser inscription, is reduced for example by faster recording methods or by a reduction of the data volume to be recorded, this system would reach its limits.

SUMMARY OF THE INVENTION

It is therefore an object of the invention to design a system for the processing of chip and/or magnetic stripe cards, which enables an increased card through put compared to the above described systems.

Briefly, the invention comprises, in one embodiment, a system for processing chip and/or magnetic strip cards (K), comprising at least one card supply magazine for accommodating cards to be processed;

at least chip and/or magnetic stripe processing station for applying data/information on the chip and/or the magnetic stripe of the cards (K), with a certain chip and/or magnetic stripe processing time being associated with the station;

at least one card body processing station for applying data/information on the card body, with a certain card body processing time being associated with the station;

a card transport system which transports the cards from the card supply magazine to the chip and/or magnetic stripe processing station and subsequently to the card body processing stations and from these onwards, wherein the processing time of the at least one chip and/or magnetic stripe processing station differs from the processing time of the at least one card body processing station, and the card transport time from the card supply magazine to one of the processing stations as well as the card transport time from one of the processing stations to another of the processing stations is shorter than a processing time of the processing station with the longest processing time;

wherein there are a first number of the processing stations with approximately the longest processing time, which first number is greater than the number of the processing stations with the shortest processing time;

wherein the system comprises a card transport plane (x, y) with a processing sequence axis (y) and a processing parallelisation axis (x) with the processing stations of different processing types being arranged in a spaced relationship one behind the other along the processing sequence axis (y);

with multiple processing stations of one processing type being arranged in parallel to each other side by side along the processing parallelisation axis (x) as a processing module;

with at least one card distribution device associated with the card transport system being arranged in the processing direction before and behind a processing module, each of said card distributing devices functioning to move cards along the processing parallelisation axis (x), and which is capable of receiving a card (K), accommodating it or discharging it to a processing station, respectively, from a card supply magazine or from another processing station after moving into a card receipt or a card discharge position, respectively.

In a further aspect of the invention, the first number of processing stations with the longest processing time compared to the second number of processing stations with the shortest processing time corresponds to the ratio of the processing times multiplied by the number of processing stations with the shortest processing time rounded to the next higher integer number.

In yet a further aspect of the present invention, the card distribution device comprises a motor driven carriage which is movable along the processing parallelisation axis (x) either in an infinitely variable or a stepwise manner, with transport rollers for a card feed and the card discharge being rotatably supported on axles which are arranged perpendicularly to the processing sequence axis (y).

Various additional important invention features are described in the following specification.

In the following the invention is described in more detail and its advantages explained with reference to the accompanying drawings.

DETAILED DESCRIPTION OF THE PREFERRED EMBODIMENTS

Figure 4:
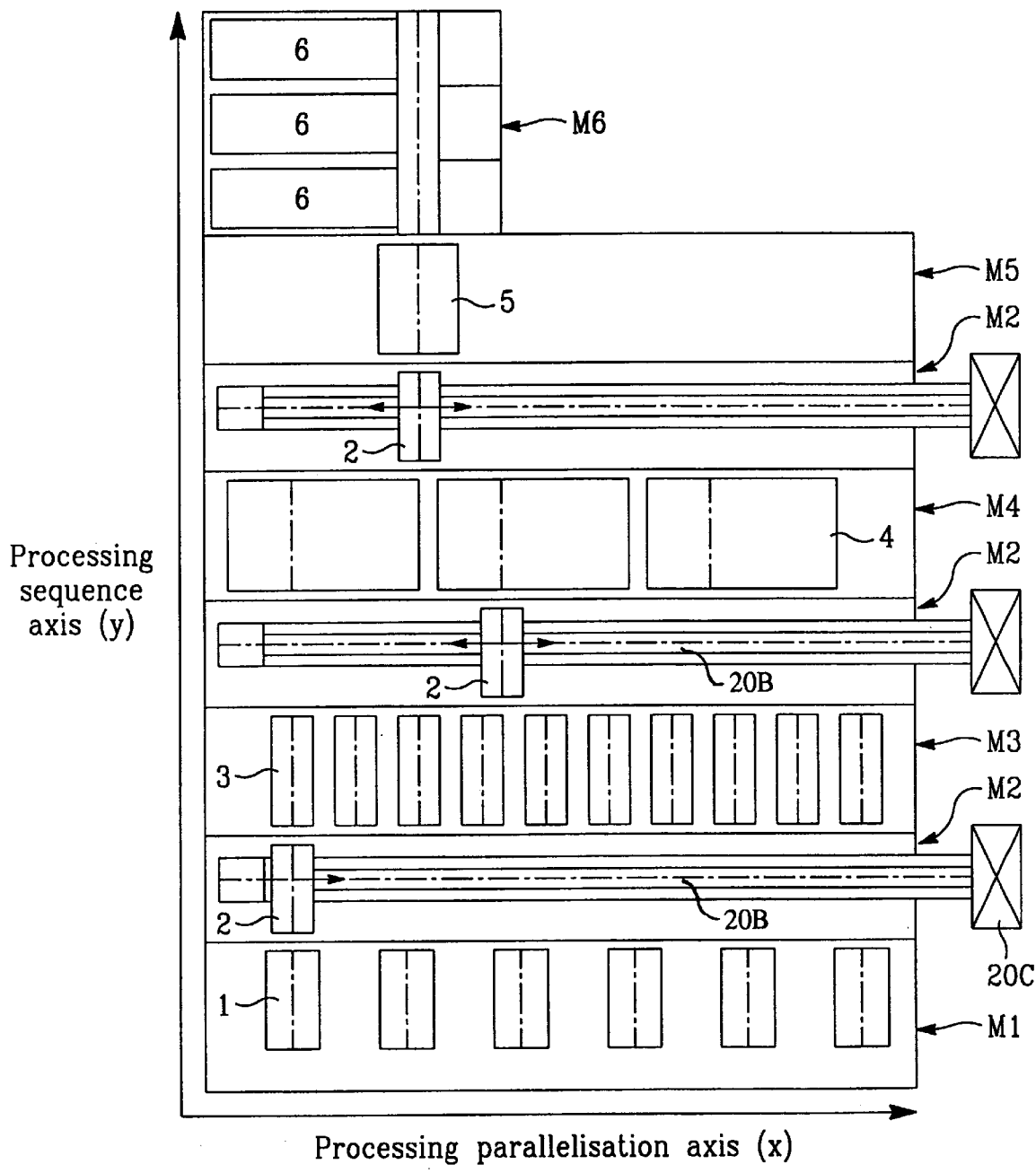
FIG. 4 shows a schematic view of the system components in a plan view.
Figure 5:
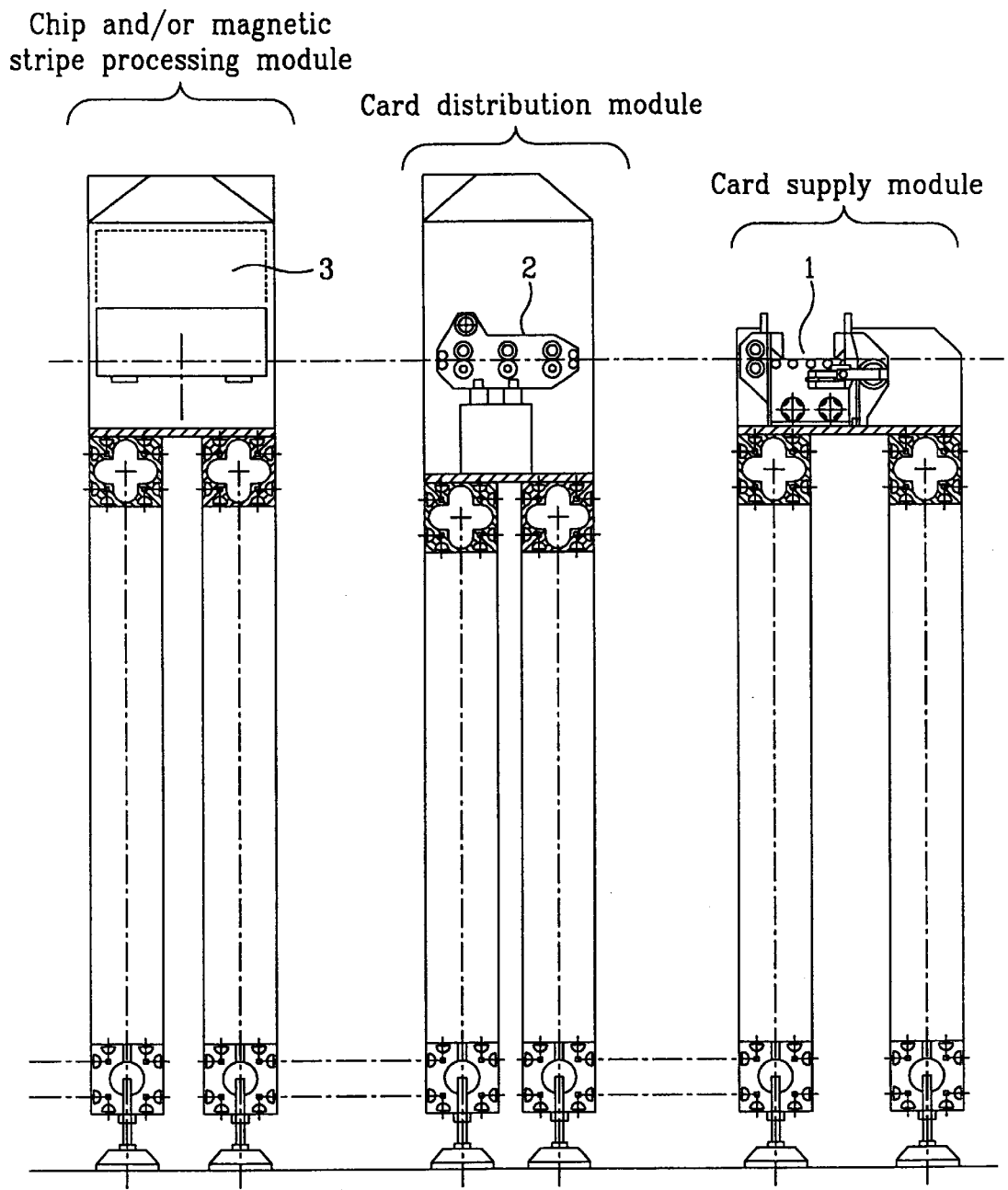
FIG. 5 shows a side view of parts of the modular system prior to assembly (from right to left: card supply module, card distribution module, chip and/or magnetic stripe processing module).
Figure 6:
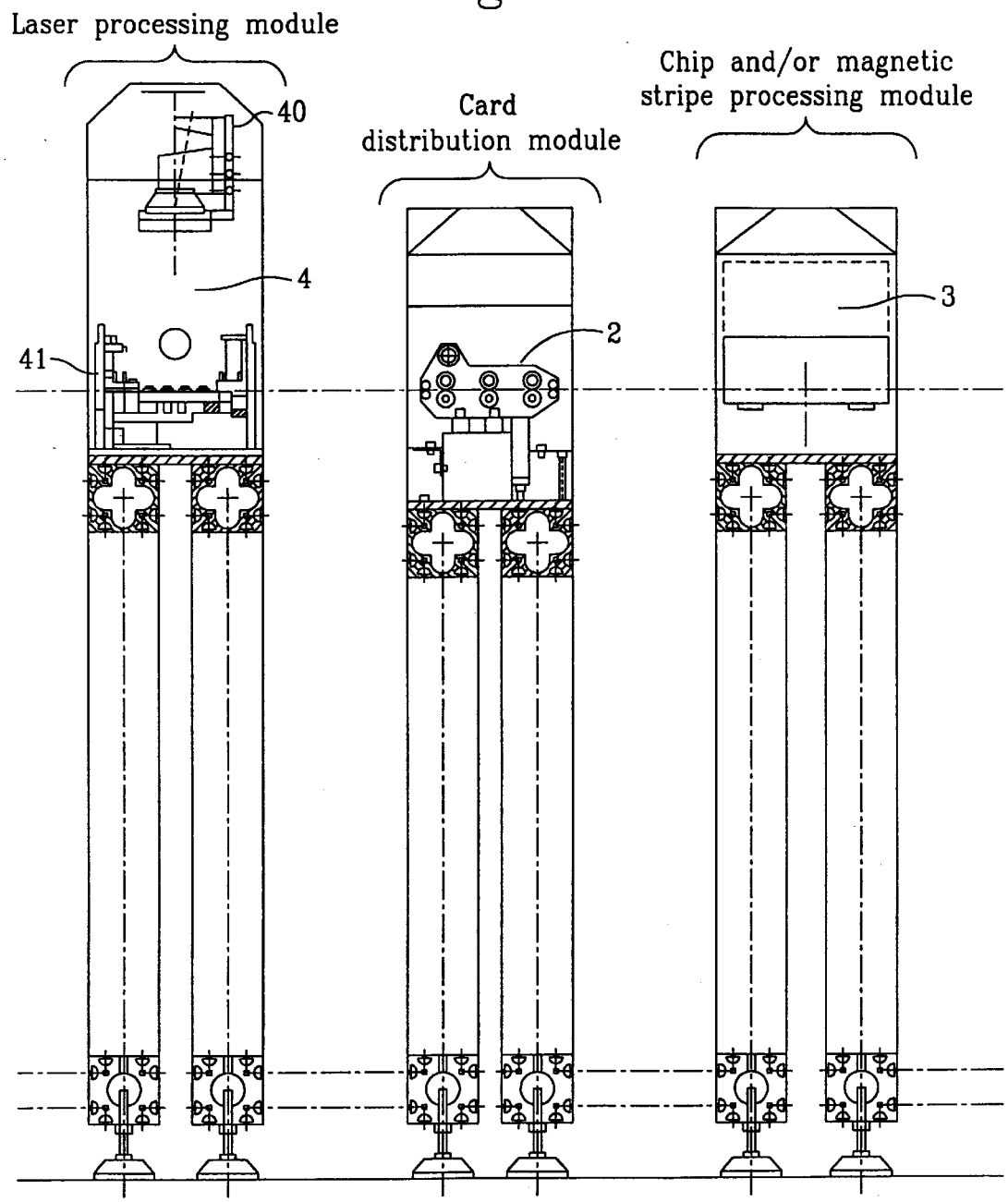
FIG. 6 shows a side view of parts of the modular system prior to assembly (from right to left: chip and/or magnetic stripe processing module, card distribution module, card body processing module, in this case laser station module).
Figure 7:
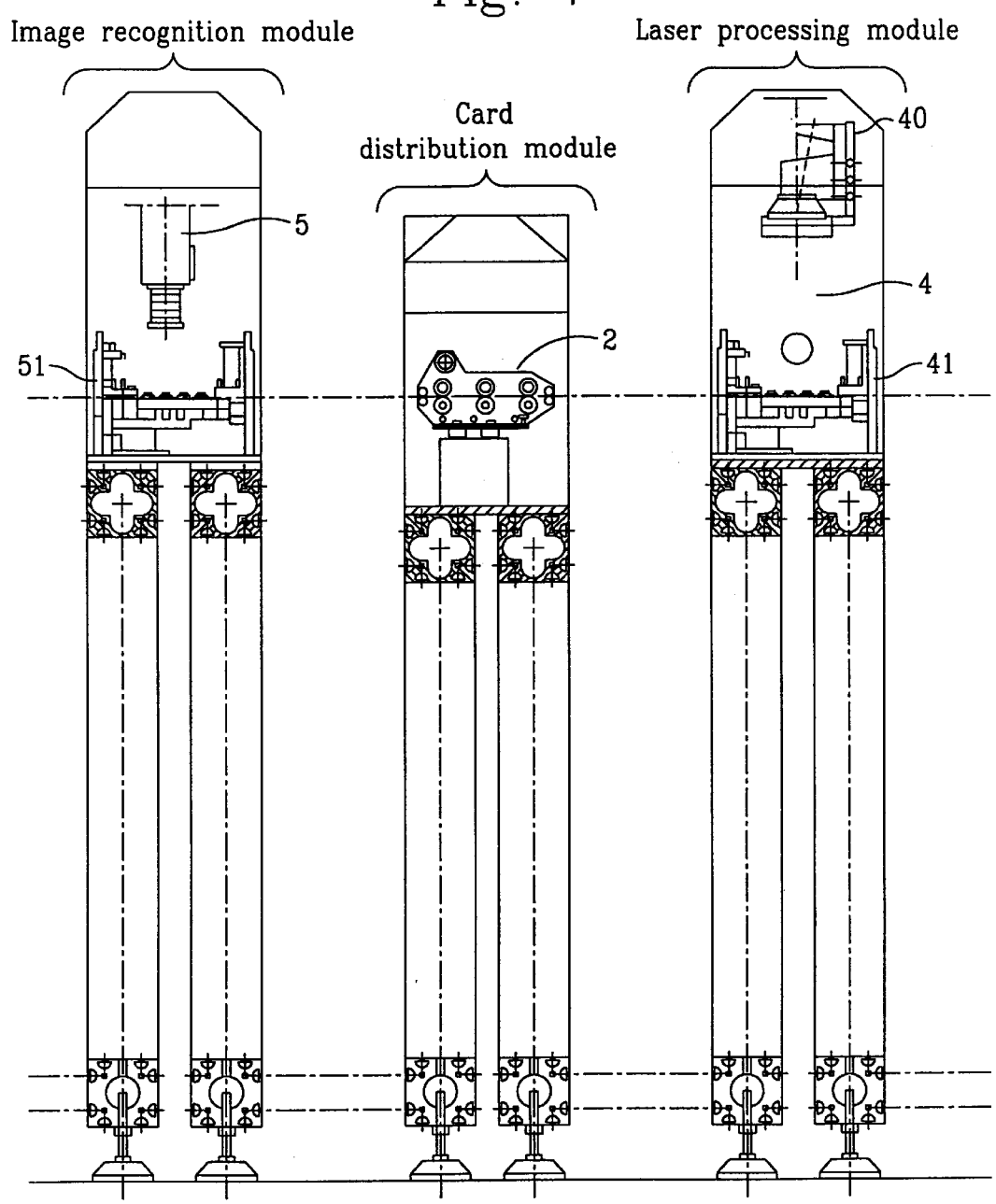
FIG. 7 shows a side view of parts of the modular system prior to assembly (from right to left: card body processing module, card distribution module, image recognition module).
Figure 8:
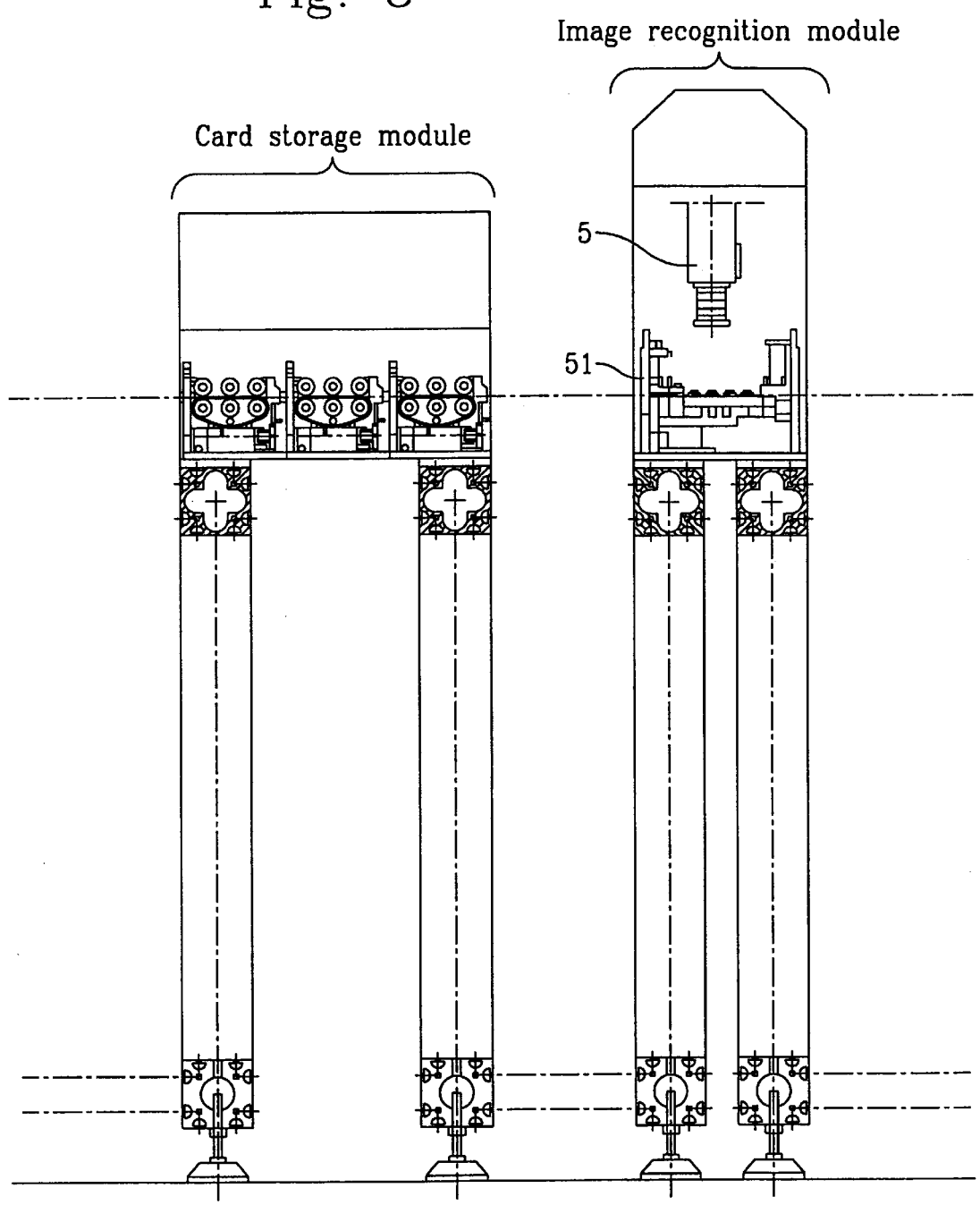
FIG. 8 shows a side view of parts of the modular system prior to assembly (from right to left: image recognition module, card storage module with three storage magazines).

Referring to the drawings, the system according to the invention comprises a card transport plane (x, y) (see FIG. 4) with a processing sequence axis (y) and a processing parallelisation axis (x). Processing stations (3, 4) of different processing types are arranged in spaced relationship behind one another along the processing sequence axis (y) and several identical processing stations (3, 4) of one processing type are arranged in parallel adjacency to each other along the processing parallelisation axis (x) as processing module (M3, M4). See FIGS. 1–4. Before and after a processing module (M3, M4) comprising of two or more processing stations (3, 4) of the same processing type, at least one card distribution device (2) each is arranged in the direction of processing which is associated with the card transport system and is movable along the processing parallelisation axis (x) and which is capable of receiving a card (K), accommodating it or discharging it to a processing station (3, 4), respectively, from a card supply magazine (1) or a processing station (3, 4) after moving into a card receipt or a card discharge position, respectively.

The stations/components of the system arranged in this manner can be mounted on a single continuous mounting plate or, preferably as shown in the embodiment, they can in turn be parts of separate system modules, with these system modules being detachably and replaceably connected with each other.

This system therefore allows the integration of processing stations (3, 4) of various processing types, in particular with different processing times, and the parallelisation of processing operations with short card transport travels. The two-dimensional card transport along the processing sequence axis (y) and the processing parallelisation axis (x) which are arranged orthogonally to one another enables these short and rapid card transport travels. The time required for moving the card distribution device (2) into the card receipt or card discharge positions as well as the time required for the card receipt and the card discharge itself is considerably shorter compared to the prior art system with the three-dimensionally moving robot arm for the card transport. The control expenditure is also reduced. After the processing of a card in a processing station, the card leaves this station in the direction of the processing sequence for the next processing station. In the system according to EP 0 256 921 and also in the above described system with the robot arm for "card handling", one card each is inserted into a processing station and removed therefrom against the direction of insertion after processing, which means a double card transport travel within the processing station. In contrast, the card in the system according to the invention leaves the processing station in the direction of the processing sequence (y) towards the next processing station.

The embodiment of the inventive system shown in the drawings comprises 10 chip and/or magnetic stripe processing stations (3), 3 laser stations (4) as card body processing stations for the application of the unchangeable data on the card body as well as 6 card supply magazines (1) with an integrated device (10) for separating the magazine contained cards (K). Note that the number of stations in each module is not critical. Each chip and/or magnetic stripe processing station (3) is capable of verifying the correctness of the recorded data in a known manner. Behind the laser stations (4) an additional image recognition station (5) is arranged in the direction of the processing sequence for verifying the correctness and quality of the data/information applied on the card body. After the completed image evaluation a decision is automatically made whether a card (K) will be transported into a designated storage magazine (6) for correctly processed cards or into a designated reject magazine (6) for defective cards.

The 6 card supply magazines (1) with their respective separation devices (10) are arranged adjacent to each other along the processing parallelisation axis (x). A supply magazine (1) can accommodate up to 400 cards depending on its design. The magazine shaft of larger magazines is designed at least over a partial section preferably with an oblique or curved section relative to vertical so that part of the weight of the cards arranged one above the other is carried by the magazine shaft so that the lower most card (K) to be separated is relieved in terms of weight.

By means of arranging several card supply magazines (1) separation devices (10) along the processing parallelisation axis (x) along which the cards of one type to be processed are distributed, the card transport travels/times for the card distribution device (2) behind the card supply magazines (1) for the supply of the chip and/or magnetic stripe processing stations (3) can be minimized. For the control of the travel of the card distribution device (2) into the respective card receipt and discharge positions, if a computer assisted system control unit is used, it may include a corresponding control algorithm which takes into consideration the various travel distances from the individual card supply magazines (1) to the various chip and/ or magnetic stripe processing stations (3). Upon the start of the card processing the chip and/or magnetic stripe processing stations (3) are successively filled with cards (K). When a chip and/or magnetic stripe processing station (3) signals that the processing of a card is completed and that it is ready to receive the next card, the control algorithm makes a decision based on a consideration of the current position of the card distribution device (2) from which card supply magazine (1) a card is to be removed relative to the chip and/or magnetic stripe processing station (3) which has become available.

In addition it is also possible to store different types of cards in the card supply magazines (1) (e.g. in the first magazine bank cards of bank A, in the second magazine bank cards of bank B, etc.). In this case cards are removed from one card supply magazine (1) and distributed to the various chip and/or magnetic stripe processing stations (3) until the job associated with this type of card has been executed.

The use of 6 card supply magazines (1) relates only to this embodiment in particular. Inventive systems with a different number of card supply magazines or with only one card supply magazine are provided as well which supplies cards to the various chip and/or magnetic stripe processing station (3) via the card distribution device (2).

The card supply magazines (1) with their separation devices (10) constructively form a card supply module (M1) which is removably connected with the system. The card supply magazines (1) with their integrated separation devices (10) in turn are removably and replaceably arranged on the card supply module (M1). This card supply module (M1) as a component of the system is connected with same by "docking" the card supply module (M1) to the first card distribution module (M2) see further below.

Figure 9:
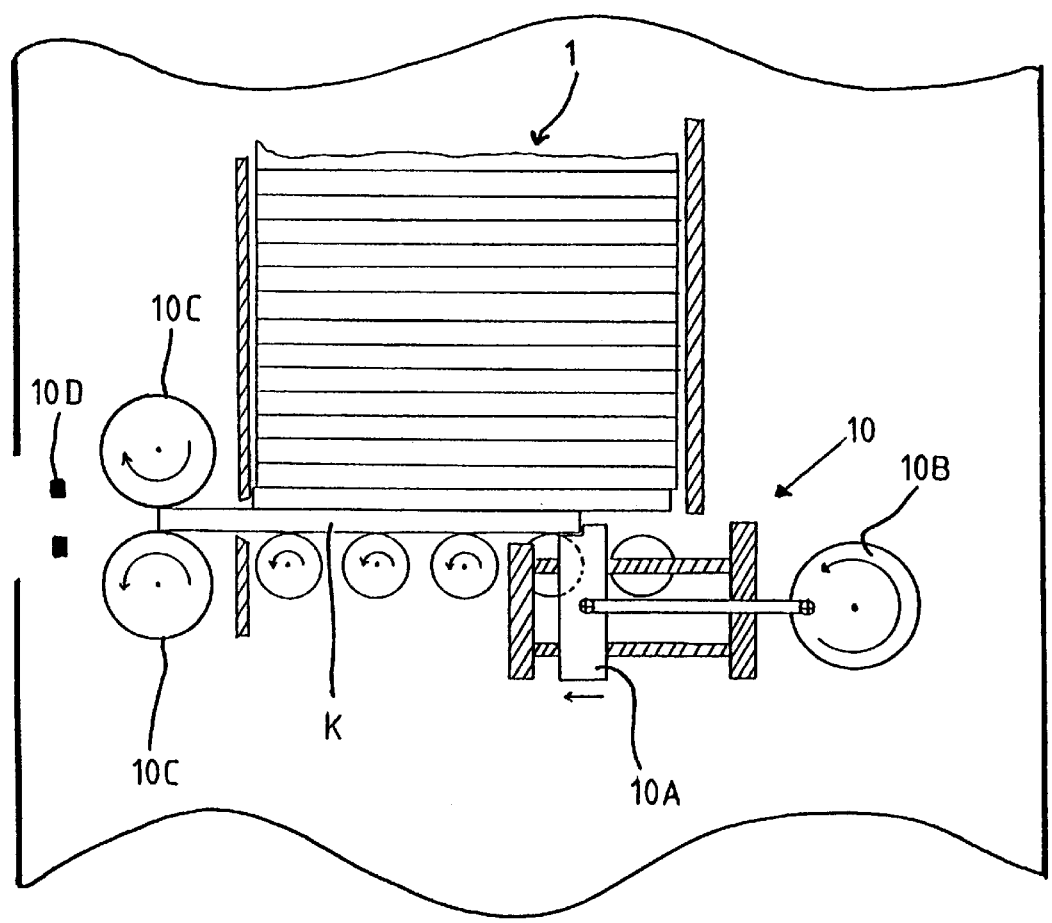
FIG. 9 shows a schematic representation of the separation of one card from the card supply magazine.
Figure 10:
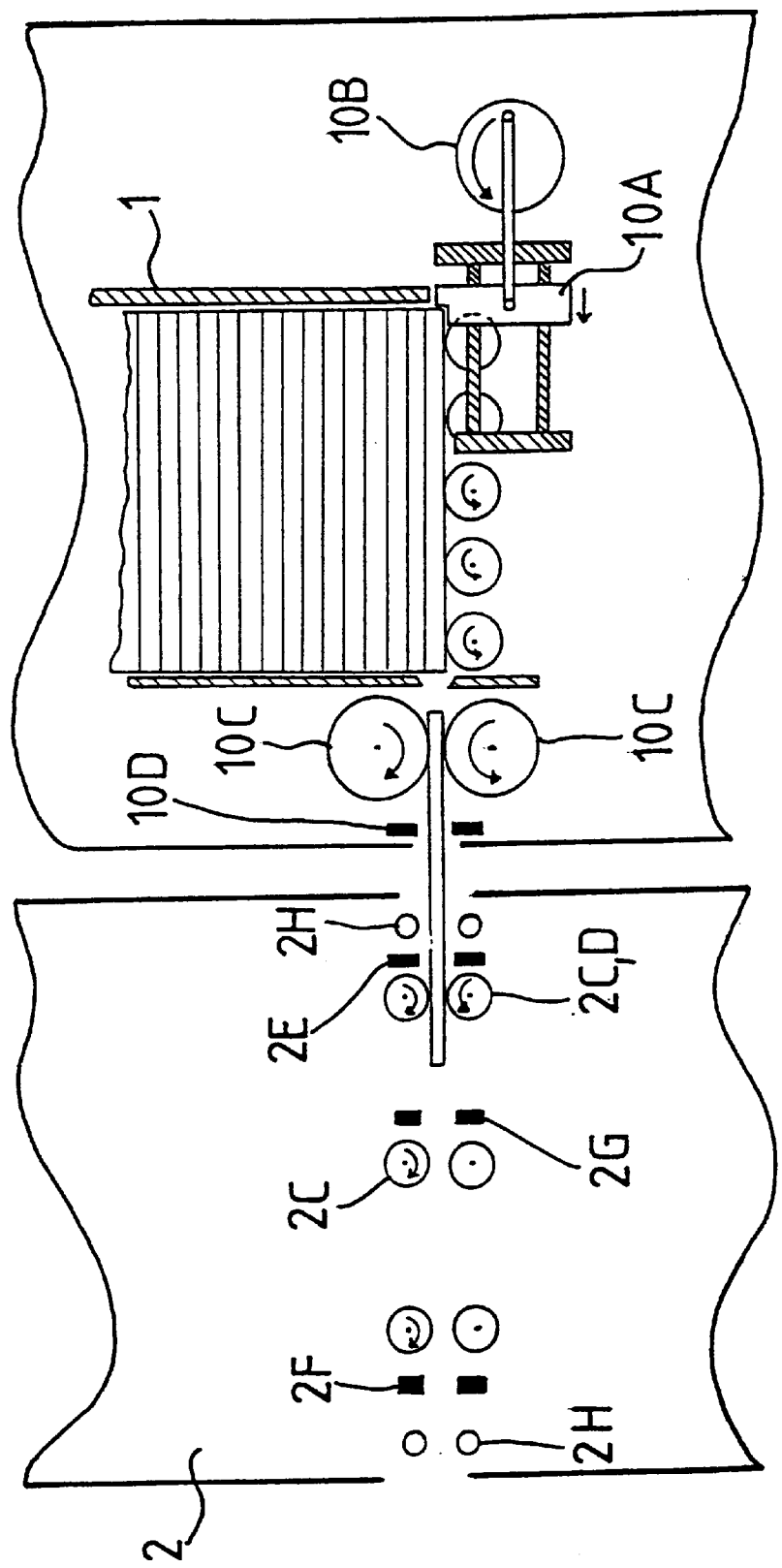
FIG. 10 is a schematic view of the card transfer from a card supply magazine to the card distribution device.
Figure 11:
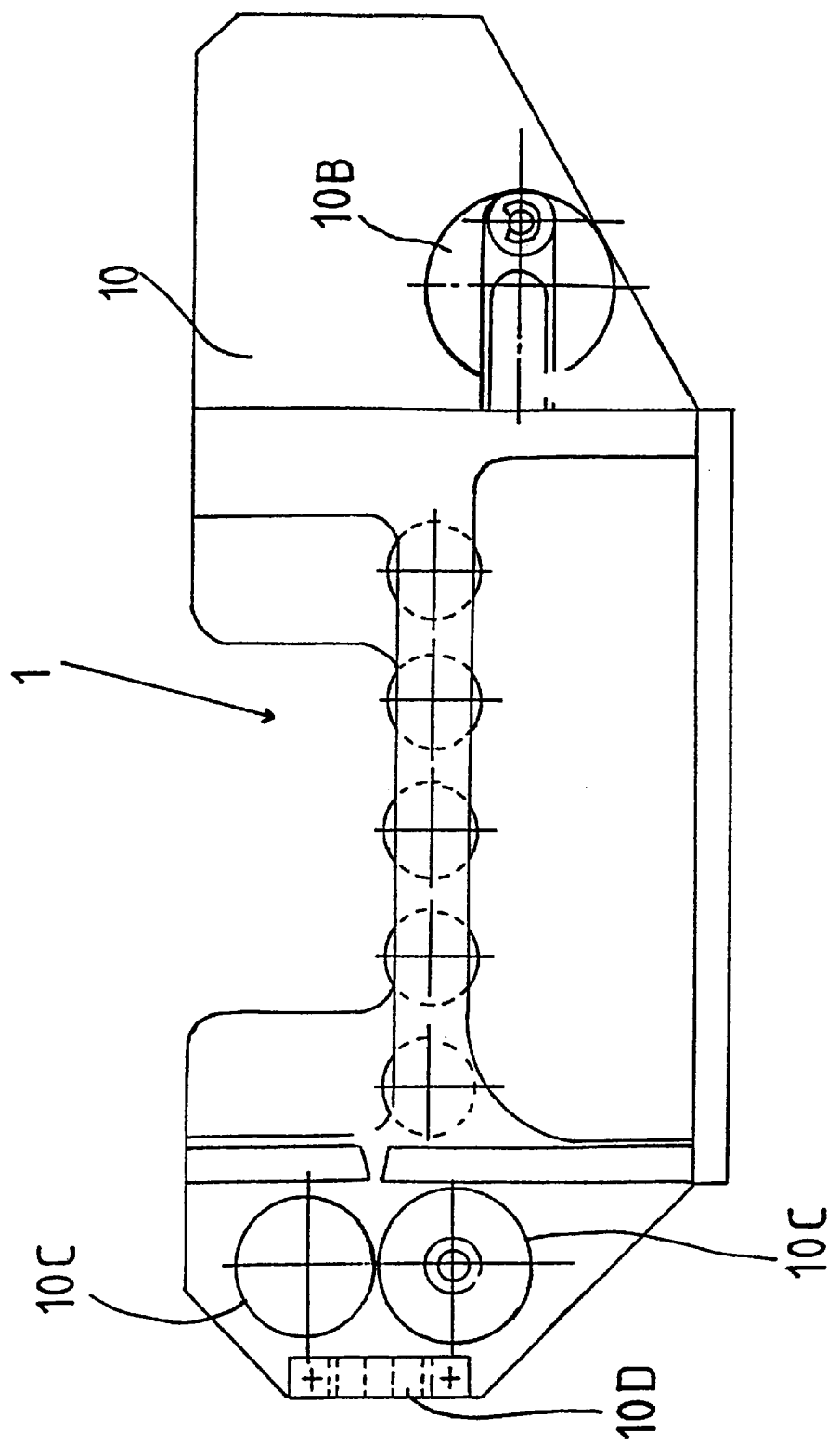
FIG. 11 shows a side view of the card separation device associated with the card supply magazine.

The separation of one card (K) from the magazine (1) is effected by the separation device (10) see FIGS. 9–11—on top of which the shaft of the card supply magazine (1) is placed. Thereby the card (K) to be separated is transferred via a slide (10A) which is driven by a crank drive (10B) to motor driven pullout rollers (10C) which pull out the card from under the card stack. This is schematically shown in FIG. 9. The transfer of the separated card to a card distribution device (2) which is in its card receipt position is schematically shown in FIG. 10. After the separated card (K) has passed a light barrier (10D) in the separation device (10) which is associated with the card supply magazine (1), the drive of the pullout rollers (10C) is switched off.

Figure 12:
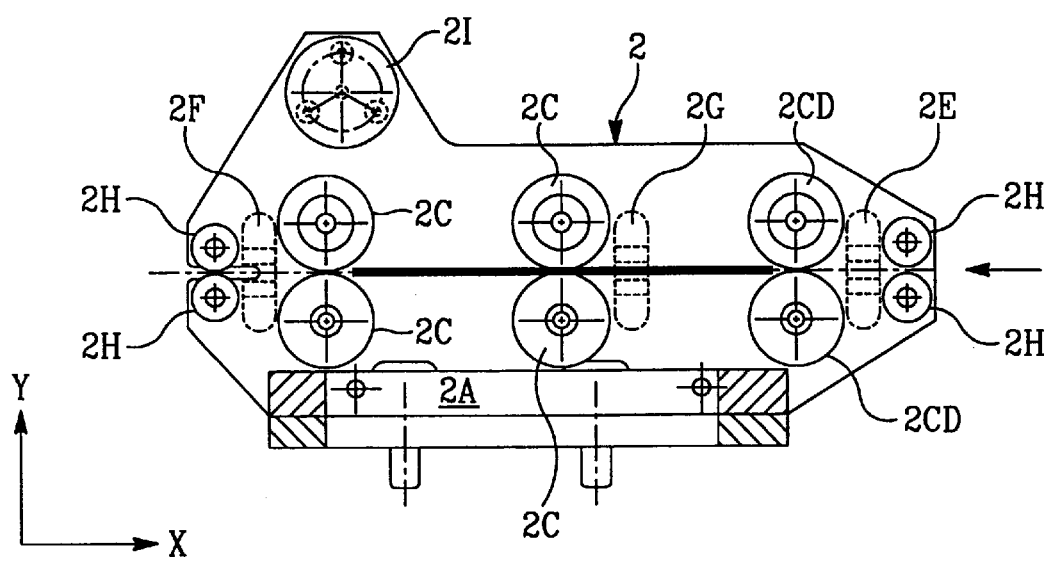
FIG. 12 is a side view of the card distribution device.
Figure 13:
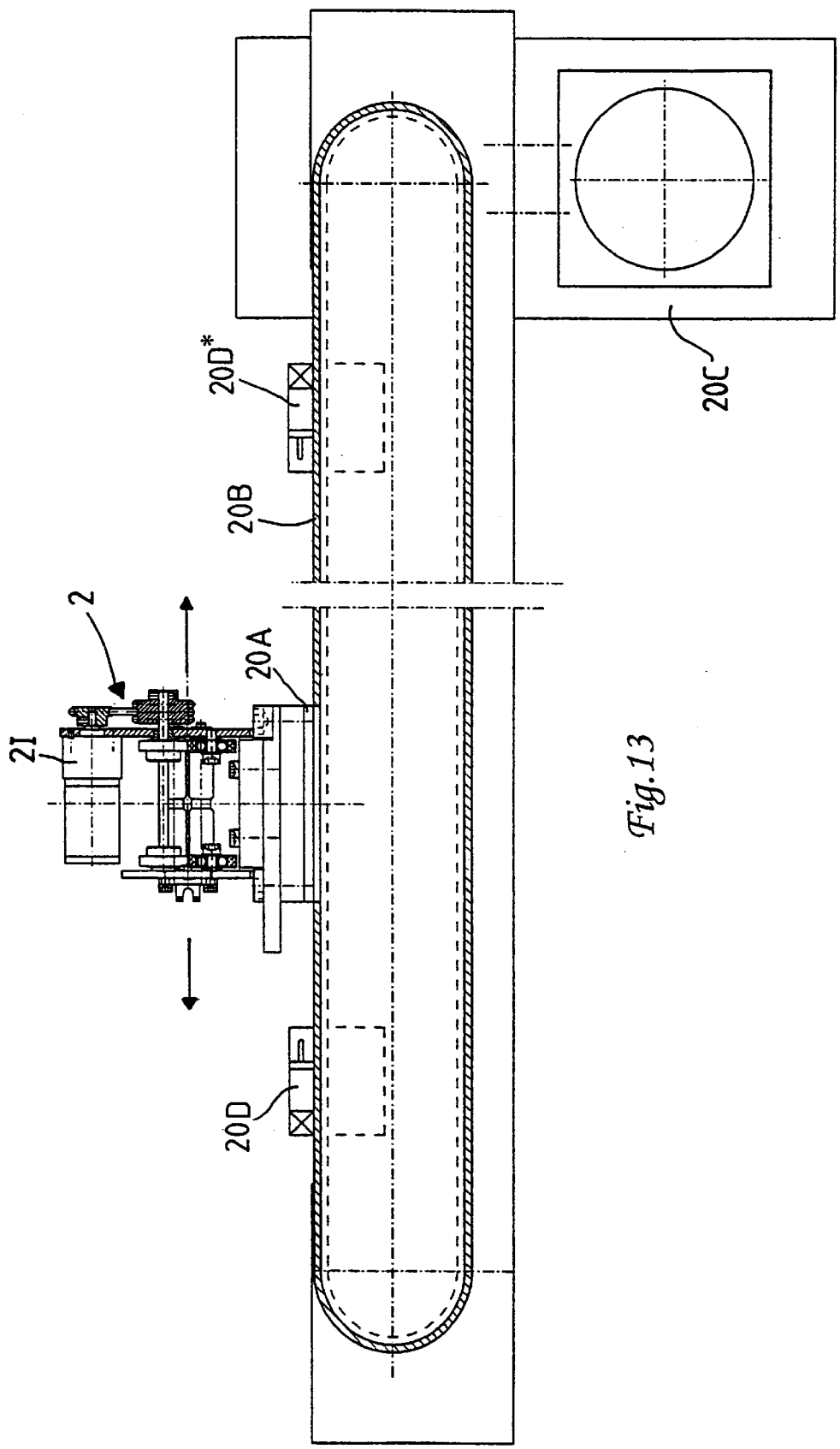
FIG. 13 is a view in the direction of the processing sequence of the card distribution device mounted on a toothed belt.
Figure 14:
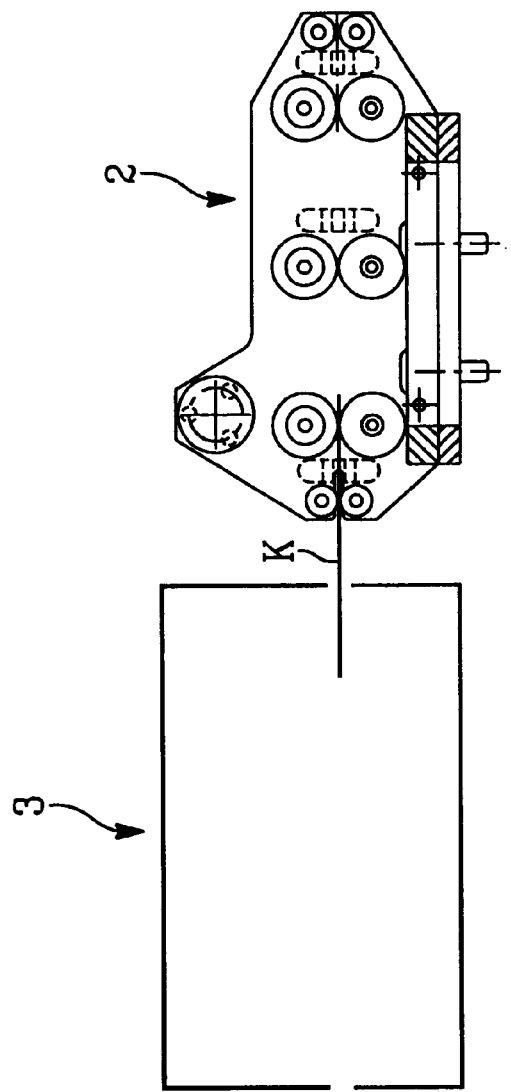
FIG. 14 is a schematic side view of the card transfer from a card distribution device to a processing station.
Figure 14:
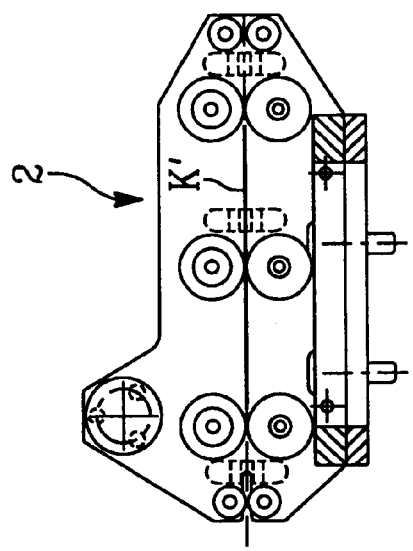

The card distribution device (2) see FIGS. 12–14—comprises a motor driven carriage (2A) which is movable along the processing parallelisation axis (x), on which a card receiving housing (2B) is mounted which in this case need not be a closed housing but, as in the present embodiment, is formed by two housing side walls. In the card receiving housing (2B) three motor driven pairs of transport rollers are arranged each of which comprises two transport rollers (2C) which are arranged one above the other accommodating between them the cards in a frictional engagement in the height of the card transport plane (x, y). These transport rollers (2C) are rotably supported on axles which are arranged perpendicularly to the processing sequence axis (y). One transport roller (2C) each of a transport roller pair can conveniently be driven by a motor. The drive direction of the transport rollers (2C) is preferably reversible so that the card distribution device (2) is capable of receiving or discharging cards in both directions. In the card transfer from the separation device/card supply magazine (10, 1) to the card distribution device (2) the cards are transferred from the pullout rollers (10C) of the separation device (10) to the feeder roller (2D) of the card distribution device (2) for further transport. (See FIG. 10). In the card receipt position the cards roll quasi pushed by the slide (10A) of the separation device (10) through into the card distribution device (2). Compared to the gripper described in EP 0 252 921 this is done considerably faster and gentler for the sensitive card surface. The card receiving housing (2B) of the card distribution device (2) is provided with at least one sensor which signals whether a fed in card has been properly received or discharged, respectively. The card distribution device (2) can be moved along the processing parallelisation axis (x) only after an appropriate sensor signal. This ensures that the card distribution device (2) is not moved if the card, for example, is still partially in the separation device (10) and only partially in the card distribution device (2). In the shown embodiment three light barriers (2E, 2F, 2G) (see FIG. 12) are provided as sensors for the card distribution device (2), the function of which is as follows: the light barrier (2E) which is arranged at the card leading edge side upstream of the transport rollers (2C) starts the drive (2I) of the transport rollers (2C) for the further feed and transport of the card (K) immediately after the detection of a card (K) transferred to the card distribution device (2). After the card (K) has passed the light barrier (2E), a message is generated which enables the moving of the card distribution device (2) along the processing parallelisation axis (x). The light barrier (2F) at the card trailing edge side generates a message when the card has passed the light barrier (2F) so that the moving of the card distribution device (2) in turn is enabled. In addition the light barrier (2F) at the card trailing edge side turns off the drive (2I) of the transport rollers (2C) immediately after the detection of a received card, while the card distribution device (2) has not yet reached the intended discharge position. The center light barrier (2G) generates a message if a card is present between the two outer light barriers (2E, 2F). This is important for determining at the first start of the system whether the card distribution device (2) is available and thus capable of receiving a card. If prior to the first start of the system, one of the light barriers (2E, 2F, 2G) signals that there is still a card in the card distribution device (2) (for any reason) the operator of the system is requested to preferably remove this card manually. For guidance/position adjustment of the cards on the card transport plane (x, y) during receipt or discharge the card receiving housing (2B) of the card distribution device (2) is provided with one each card guidance means both at the card leading and trailing edge. In the shown example this is formed by two guide rollers (2H) arranged in a spaced relationship, one above the other, with the axes of rotation extending vertically to the processing sequence axis (y). The distance between the guide rollers (2H) is larger than one and smaller than two card thicknesses. This ensures that cards which are received or which are to be discharged in a slightly inclined position relative to the card transport plane are returned to the transport plane (x, y). On the card trailing edge side the card receiving housing (2B) is provided with a slot which extends from the light barrier (2F) between the guide rollers (2H) and which opens to the outside so that a movement of the card distribution device (2) is already possible when a card has actually been discharged to the chip and/ or magnetic stripe processing station (3) but the rear end of the card is still between the guide rollers (2H). This saves unnecessary waiting time.

FIG. 13 shows how the card distribution device (2) of the embodiment is moved. The carriage (2A) of the card distribution device (2) is mounted via a mounting plate (20A) immediately on a motor driven circulating toothed belt (20B). The toothed belt (20B) can be moved between two boundary positions. For this purpose two limit switches (20D, 20D*) are provided opposite each other and spaced by the travel distance and which are activated by the carriage (2A) upon reaching the l.h. or the r.h. boundary position to turn off the drive (20C) of the toothed belt (20B). Between these two boundary positions the toothed belt (20B) with the card distribution device (2) moves into the corresponding predetermined card receipt or card discharge position, respectively. In the system according to one embodiment the maximum travel speed of the card distribution system (2) is approximately 2.5 m/s, die maximum acceleration is approximately 10 M/s$^2$. This enables the card distribution device (2) to pass the maximum travel distance in this special embodiment of the system, approximately 1 m in about 1 s. With a card transport velocity of 200 to 400 mm/s through the transport rollers (2C) of the card distribution device (2), this is able to transfer the cards of a length of 85 mm at a time less than 0.5 s to a processing station. By using toothed belts (20B) of different lengths with a corresponding guide rail the maximum possible travel distance of the card distribution device (2) can be adapted in a flexible manner to various parallelisation depths, i.e., the number of multiple processing stations (3, 4) arranged in parallel to each other, which are supplied with cards by the card distribution device (2). It is additionally intended to mount two card distribution systems (not shown) on the toothed belt whereby a division of the travel distance is effected. The card distribution device (2) including the toothed belt (3), drive, etc. constructively forms a card distribution module (M2) which as a system component, is removably and replaceably connected with same. The card distribution module (M2) between the card supply module (M1) and the chip and/or magnetic stripe processing module (M3) may be of identical design with the card distribution module (M2) which is arranged between the chip and/or magnetic stripe processing module (M3) and the laser processing module (M4) and in the embodiment also of identical design with the card distribution module which is arranged between the laser processing module (M4) and image recognition module (M5). The card distribution module (M2) can readily be installed in "sandwich design" between two system modules (M1, M3, M4, M5).

The following three additional embodiments (not shown) for the movability of the card distribution device will be described. In a first alternative embodiment the carriage of the card distribution device is movably installed on at least one guide rail which is arranged in parallel to the processing parallelisation axis. The carriage is connected with a circulating motor driven belt which extends parallel to the guide rail to be moved between two boundary positions and movable with same. In the second alternative embodiment the carriage of the card distribution device is also installed so as to be movable on at least one guide rail which is arranged in parallel to the processing parallelisation axis. The carriage is connected with two motor driven traction cables which extend parallel to the guide rail and is moved by same. In the third alternative embodiment the carriage of the card distribution device is moved by means of a motor driven threaded spindle which is arranged parallel to the processing parallelisation axis.

FIG. 14 (right to left) shows schematically the transfer of a card (K) from the card distribution device (2) to a chip and/ or magnetic stripe processing station (3) which is illustrated as a block box. Behind the processing station (3) a card distribution device (2) is arranged in which the previously processed card (K') is waiting to be further transported. The chip and/or magnetic stripe processing stations (3) which are arranged in parallel constructively form the chip and/or magnetic stripe processing module (M3). An embodiment of the system (not shown) provides for two chip and/or magnetic stripe processing modules of identical design, each of which comprises the same number of stations (3) which are arranged one behind the other in the processing sequence direction without the intermediate arrangement of a card distribution module (M2) to be combined again as a processing module (M3') in order to still further increase the card throughput. The card transport through successively arranged chip and/or magnetic stripe processing modules is effected by the modules themselves. After recording the data in one of these stations (3) the cards (K) are transferred to the following card distribution device (2) and further to an available or the soonest available station, respectively, of the three laser stations (4).

Figure 15:
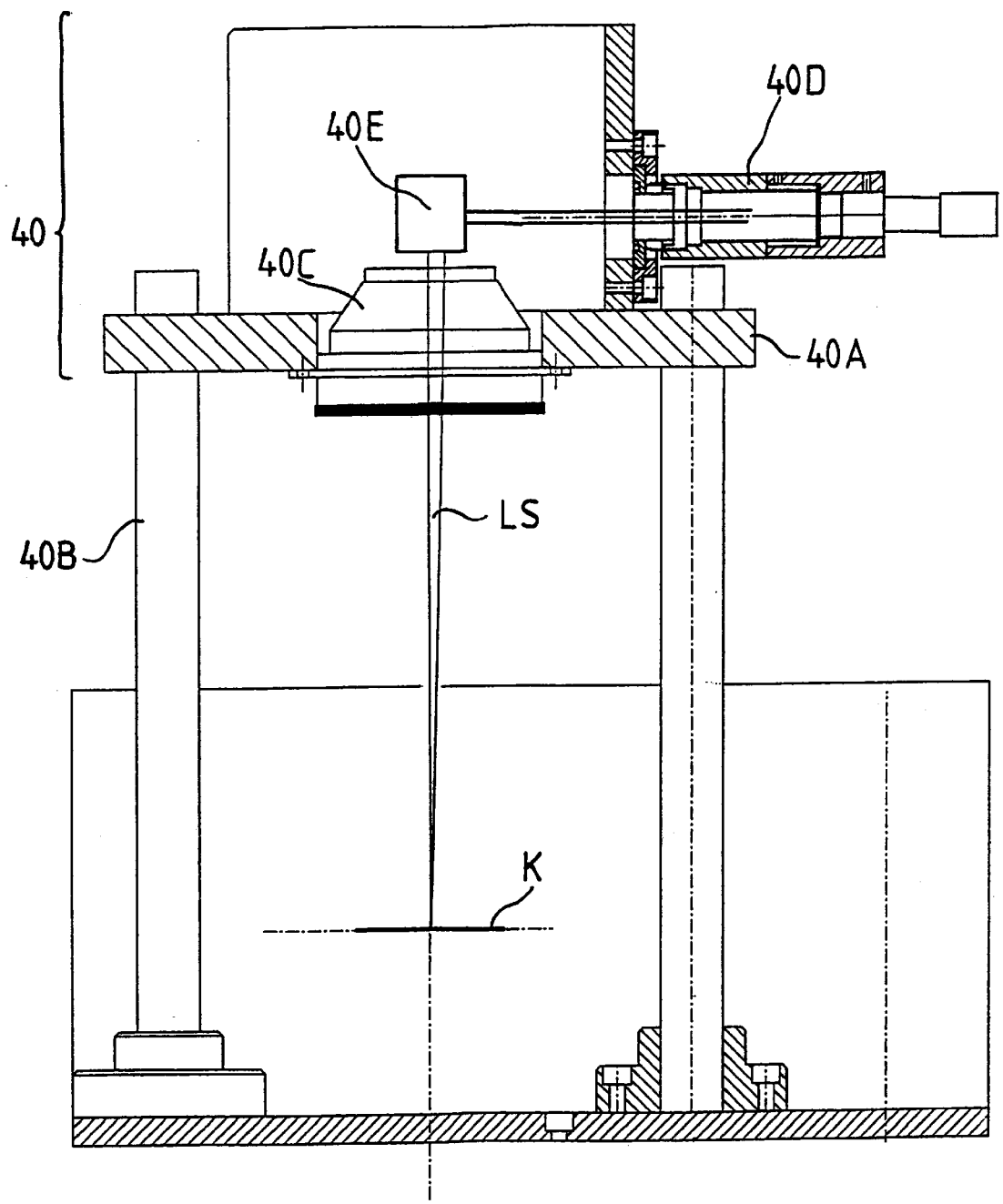
FIG. 15 is a schematic side view of the laser inscription station.

FIG. 15 shows a side view of the laser inscription station (4). The laser beam is generated in separate laser systems (in the embodiment a neodym YAG laser, $\lambda=1.06$ $\mu$m) remote from the inventive system. The laser radiation is supplied via a glass fibre (not shown) to the laser inscription head (40), which for adjustment reasons is variable in height relative to the card transport plane (x, y). The laser inscription head (40) is mounted on a mounting plate (40A) which is secured on supporting rails (40B) so as to be variable in height. In the mounting plate (40A) a plane field lens (40C) for focussing the laser radiation (LS) to the card (K) is provided. The coupling of the laser radiation (LS) via the glass fibre is effected by means of a coupling in device (40D) which is arranged at the head (40) and which comprises a coupling lens for the divergent laser beam emitted from the glass fibre. The laser beam (LS) which leaves the coupling lens approximately parallel impinges on the plane field lens (40C) via a pair of deflection mirrors (40E) and then on to the card (K) for card inscription.

Figure 16:
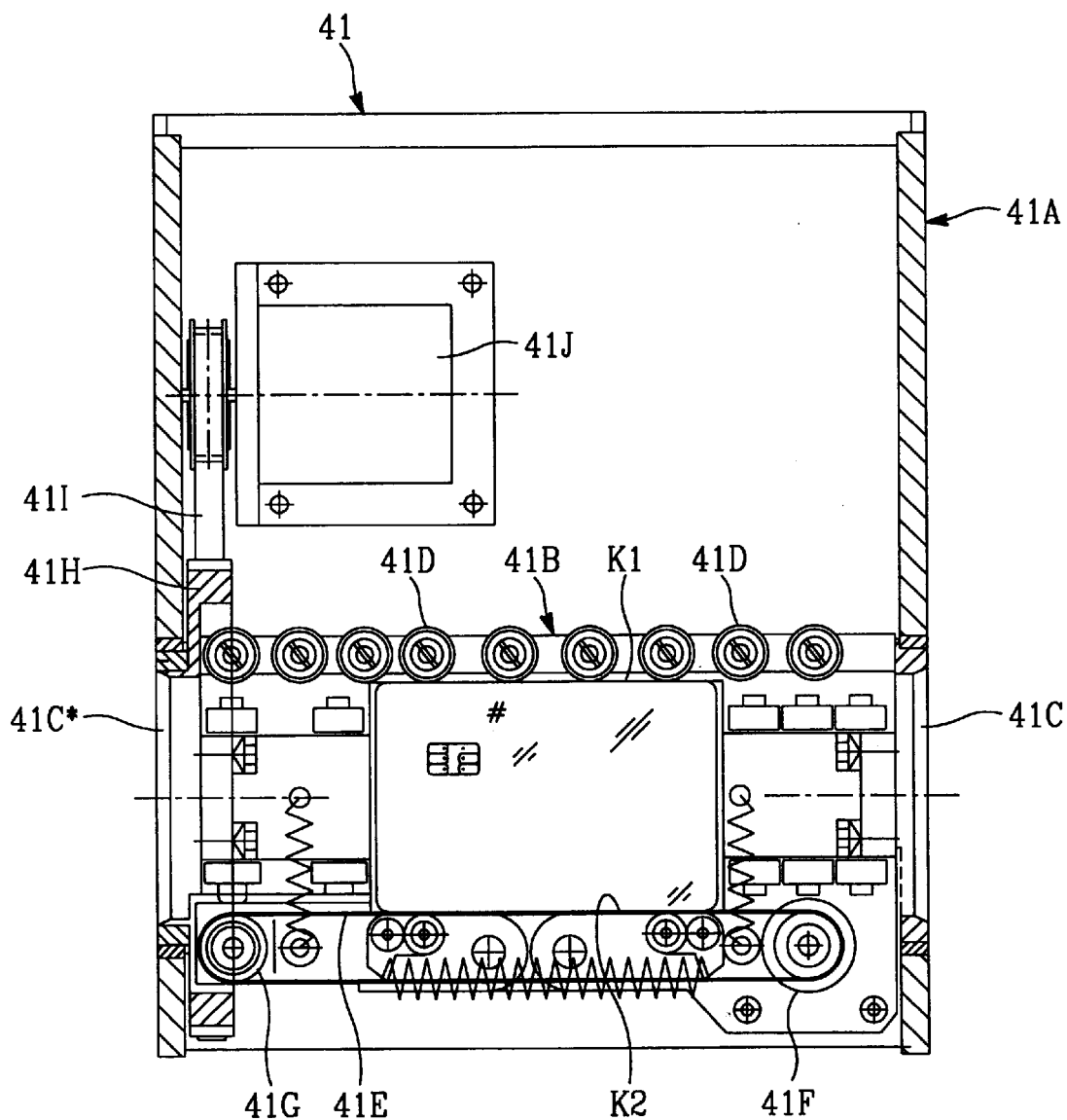
FIG. 16 shows a plan view of the card transport and positioning device associated with the laser inscription station.
Figure 17:
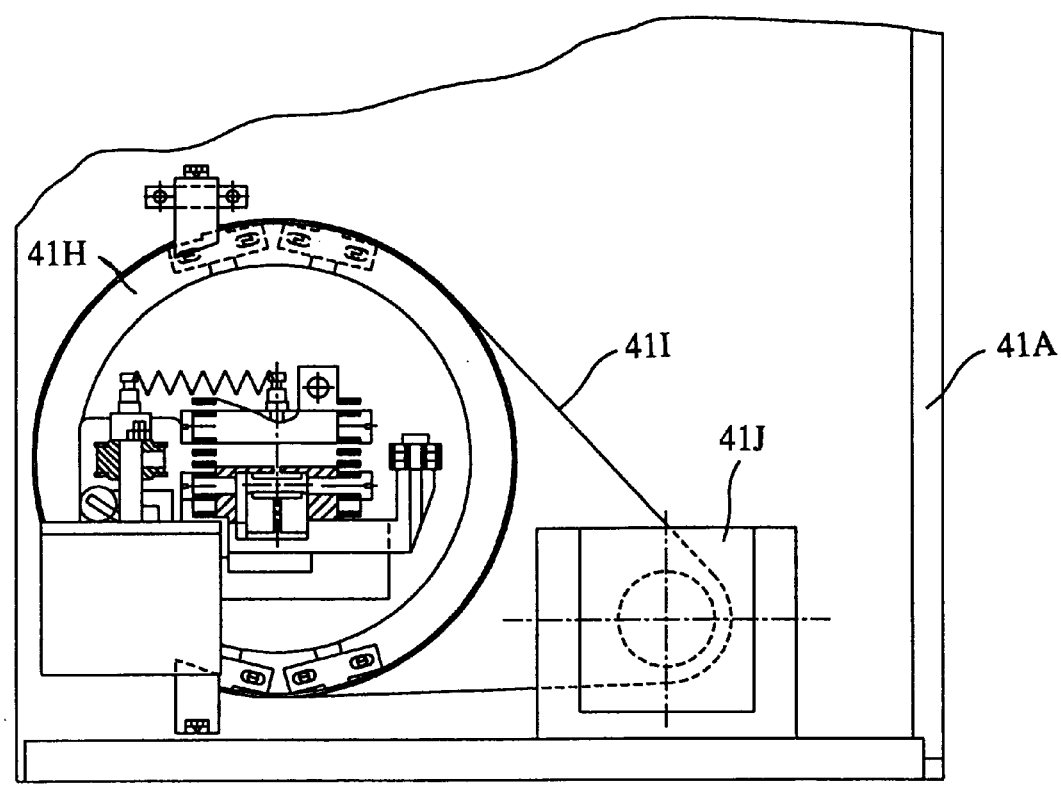
FIG. 17 is a side view of the card transport and positioning device associated with the laser inscription station for detailing the card reversing option.

Part of the laser inscription station (4) is a specially developed transport and positioning device (41) for the cards (K). See FIGS. 16 and 17. This transport and positioning device (41) comprises a mounting frame (41B) with an insertion slot (41C) and an opposite arranged discharge slot (41C*) aligned with same, with an inlet centering means being arranged behind the insertion slot (41C) and a discharge centering means being arranged before the discharge slot (41C*) for the centering of the cards to the card transport plane (x, y). This device enables the positioning of the card in such a manner that the plan view of the card surfaces (front and rear side) is not even partially hidden. Thus, a completely unhidden inscription and viewing window is provided. This is mandatory for an unrestricted laser inscription on the entire card surface. Between the insertion slot (41C) and the discharge slot (41C*) and parallel with the card transport direction a series of adjacent to each other and rotatably supported guide rollers (41D) for the cards is arranged at the mounting frame (41B), whose axes of rotation extend perpendicularly to the card transport plane (x, y). Opposite to and at a distance from the guide rollers (41D) a transport belt (41E) is provided which extends approximately over the length of the guide roller series. This transport belt (41E) is held between a motor driven drive roller (41F) and a driven roller (41G) whose axes of rotation extend perpendicular to the card transport plane (x, y). The cards (K) are held for transport and positioning at their longitudinal edges (K1, K2) between the guide rollers (41D) and the transport belt (41E). This enables completely unhidden card surfaces. Moreover, the transport and positioning device (41) enables reversing of the card (K) so that the rear side can be inscribed. See FIG. 17. For this purpose, the mounting frame (41B) with the insertion slot (41C) and the discharge slot (41C*), the series of guide rollers (41D) and the transport belt (41E) are supported in a housing (41A) so as to be rotatable through 180° about an axis parallel to the card transport direction. A rotary disk (41H) is attached at the mounting frame (41B) coaxially with the card transport direction which is positively and/or nonpositively connected with a drive motor (41J) via a drive belt (41I). The transport and positioning device (41) can receive the cards in the reversed and the nonreversed position from the card distribution device (2) and discharge them to the next card distribution device (2). The three laser inscription stations (4) constructively form the laser processing module (M4) which, as a component of the system, is removably and replaceably connected with same.

Figure 18:
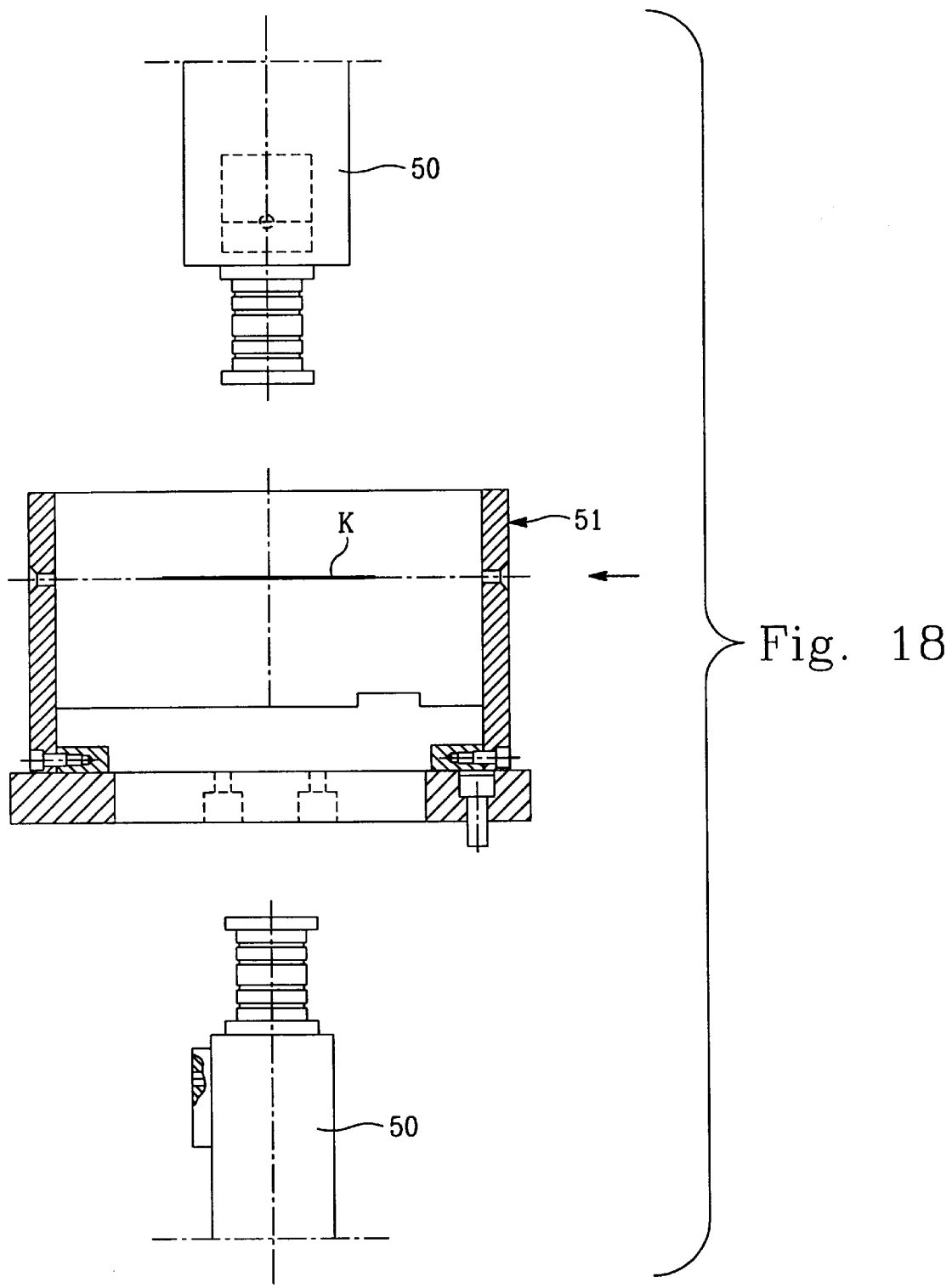
FIG. 18 is a schematic view of the image recognition system.

FIG. 18 illustrates an image recognition station (5) which is arranged in the processing sequence direction behind the laser processing module (M4) for verifying the correctness and quality of the data applied on the card body (Hans Mustermann, Kontonr.: . . . John Doe, Account No.: . . . ). This consists of two cameras (50), preferably CCD cameras, which view the card (K) from above and from below. With these cameras (50) the correctness of the laser inscribed card specific data on the card can be verified by a comparison of the respective evaluated image with a data set which is associated with the respective card. In addition to the correctness it is also possible to verify the quality of the laser inscription (contrast, line definition, etc.). Cards with an incorrect or poor laser inscription are rejected. For transport and positioning of the cards received from the laser stations (4) the image recognition station (5) comprises a transport and positioning device (51). In this case, too, like in the laser station it is essential that the cards to be viewed by the cameras (50) are not hidden by parts of the transport and positioning device (51). For this reason the transport and positioning device (51) employed in the image recognition station (5) is preferably of identical design to the transport and positioning device (41) of the laser station (4). If as in the case of the embodiment two cameras (50), one for the card front surface and one for the card rear surface, are employed the reversing option can be dispensed with. Detected defective cards are placed into a reject magazine (6).

After the image recognition station (5), the cards are placed into one of the storage magazines (6). In the embodiment, three storage magazines (6) each are constructively combined to one card storage module (M6). Which of the storage magazines (6) are used for the "accept" cards and which for the "reject" cards can be flexibly specified by the operator of the system via the system control unit.

Here, another advantage of the inventive system should be mentioned. The processing ("personalization") of cards in this system ensures that the sequence of the completed cards in the "accept" card storage magazines corresponds to the sequence of the data sets (e.g. successive card numbers) recorded in the system even in the case which for various reasons can never be excluded in which the application of the data in the chip and/or magnetic stripe processing station (3) or in the laser station (4) was incorrect or inadequate. It is mandatory to maintain the correct card sequence in cases where this is assumed in subsequent, automated processing steps (e.g. in shipping facilities for the cards). As already mentioned, a direct verification takes place in the chip and/or magnetic stripe processing station (3) whether the data has been correctly recorded on the chip or on the magnetic stripe, respectively. If recording of the data on the card is not possible, e.g., due to a defective chip or magnetic stripe, then only those data sets/cards which in terms of order range between the last "accept" and "reject" card will be executed. A virgin card will be removed from the card supply magazine (1), and the card/user specific data set of the "reject" card will be applied on same. Subsequently, the normal processing continues. The same applies to errors in the laser inscription, which are detected in the image recognition station (5).

The "reject" cards are placed into a reject magazine (6). In order to avoid a "jam" of "reject" cards in the processing stations (3, 4), the chip and/or magnetic stripe processing module (M3) and the laser inscription module (M4) each are assigned a parking and/or bypass station (3*, 4*). See FIG. 3. If, for example, the chip of a card is found to be defective in a chip and/or magnetic stripe processing station (3), which means that no data can be recorded on that card, then the affected card must be transported into the reject magazine (6). If all laser inscription stations (4) downstream of the chip and/or magnetic stripe processing module (M3) are occupied with cards to be inscribed, the "reject" card is transported by the card distribution devices (2) past the laser inscription stations (4) via the bypass station (4*) into the reject magazine (6). If necessary, the "reject" card is intermediately stored in the bypass station (4*). In the case of the parking/bypass station (4*) being already occupied by a "reject" card, the parking station (3*) can be used.

In lieu of card supply modules (M1) the system can also be provided with an enveloping machine for the detachable fixing/packaging of the processed cards on/in a carrier. Alternatively, the system transfers the completed cards to such a machine, with "reject" cards being removed via a switch.

In addition to or in lieu of the laser station (4), the system can be provided with an embossing station, a thermal transfer printer, a thermal sublimation printer for color printouts or an ink jet printer as the card body processing station. Depending on the processing time in these stations relative to the other processing stations, a multiple of these is provided along the processing parallelisation axis (x).

Note that in one aspect of the invention, the first number of processing stations with the longest processing time compared to the second number of processing stations with the shortest processing time corresponds to the ratio of the processing times multiplied by the number of processing stations with the shortest processing time rounded to the next higher integer number.

Figure 1:
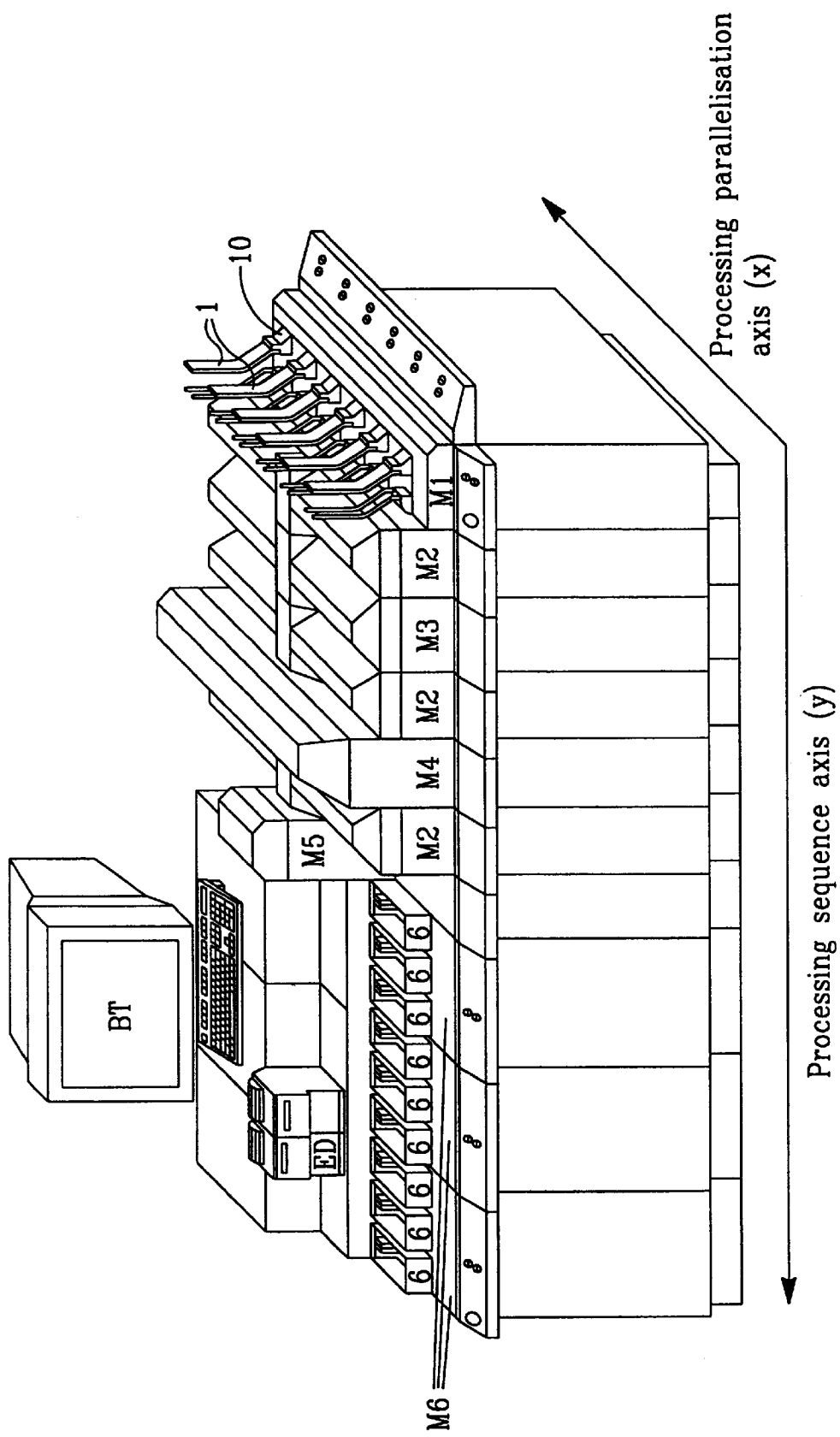
FIG. 1 shows a perspective view of the system.
Figure 2:
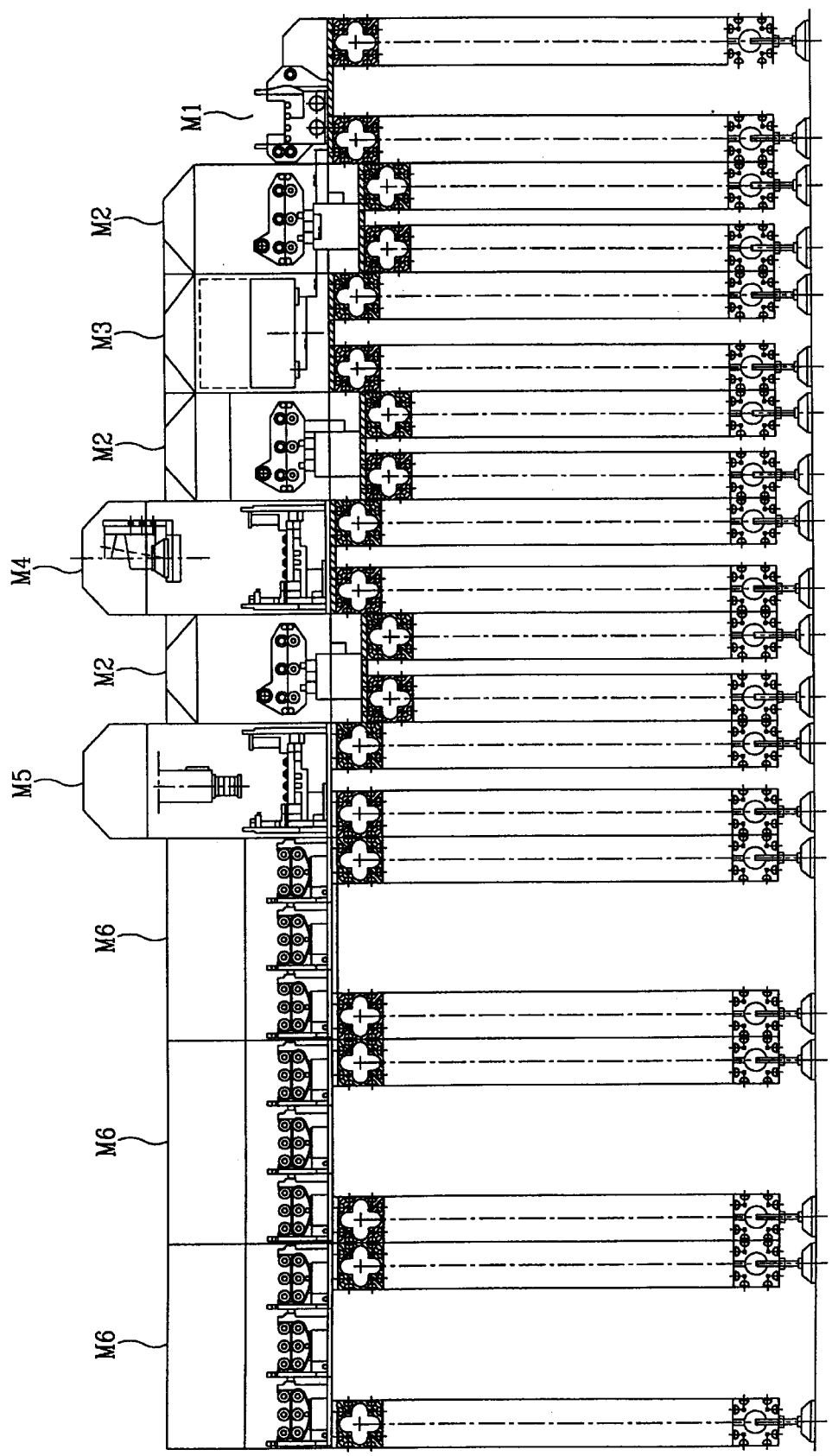
FIG. 2 shows a side view of the system.
Figure 3:
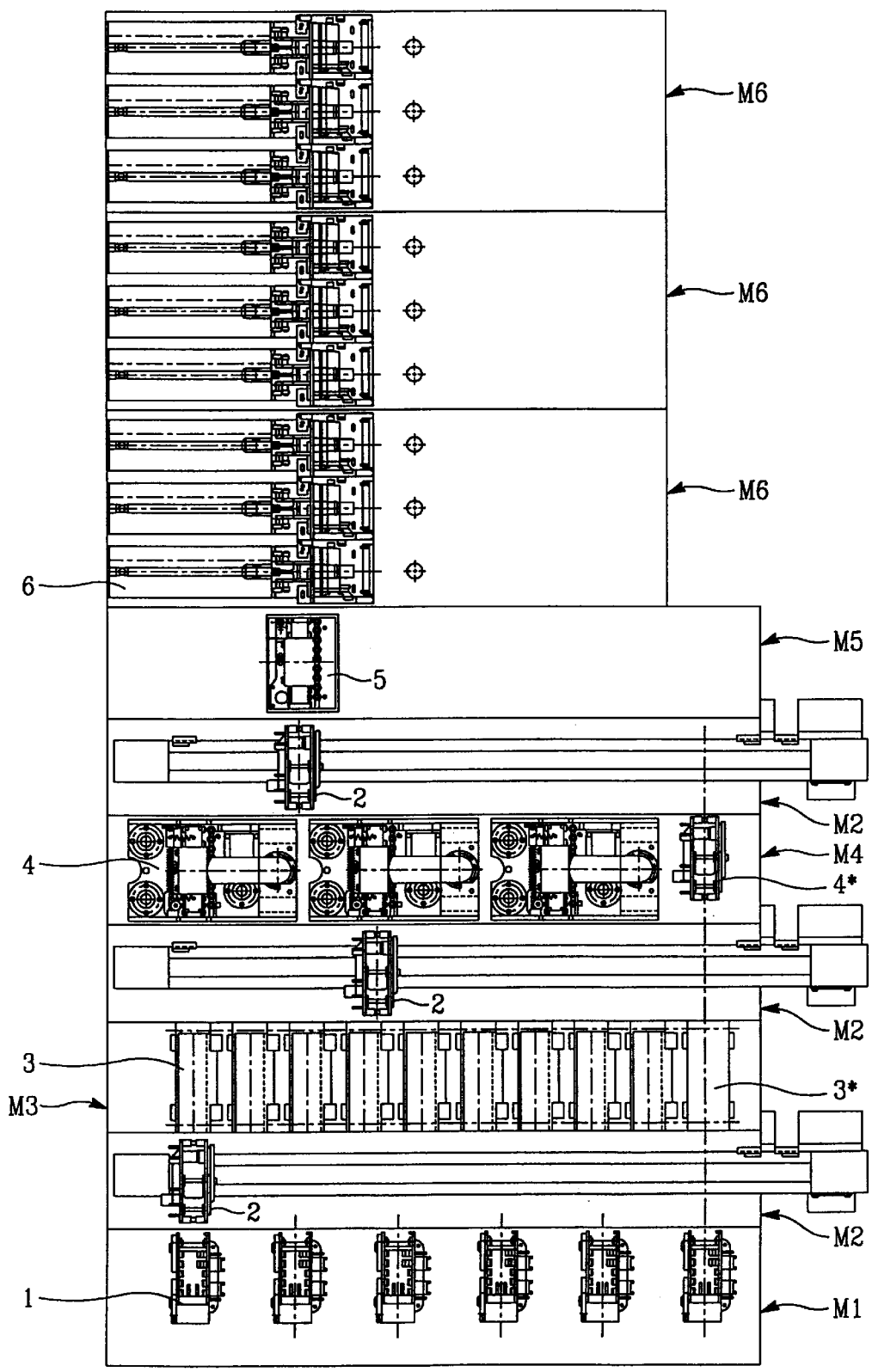
FIG. 3 shows a plan view of the system.

FIG. 1 also shows the operator terminal (BT, monitor) of the system control unit for the operator as well as two label printers (ED) for printing batch number labels which are adhered to the magazines with the completed cards.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A system for processing chip and/or magnetic strip cards (K), comprising at least one card supply magazine for accommodating cards to be processed;

at least chip and/or magnetic stripe processing station for applying data/information on the chip and/or the magnetic stripe of the cards (K), with a certain chip and/or magnetic stripe processing time being associated with said station;

at least one card body processing station for applying data/information on the card body, with a certain card body processing time being associated with said station;

a card transport system which transports the cards from the card supply magazine to the chip and/or magnetic stripe processing station and subsequently to the card body processing stations and from these onwards, wherein the processing time of the at least one chip and/or magnetic stripe processing station differs from the processing time of the at least one card body processing station, and the card transport time from the card supply magazine to one of said processing stations as well as the card transport time from one of said processing stations to another of said processing stations is shorter than a processing time of the processing station with the longest processing time;

wherein there are a first number of the processing stations with approximately the longest processing time, which first number is greater than the number of the processing stations with the shortest processing time;

wherein the system comprises a card transport plane (x, y) with a processing sequence axis (y) and a processing parallelisation axis (x) with the processing stations of different processing types being arranged in a spaced relationship one behind the other along the processing sequence axis (y);

with multiple processing stations of one processing type being arranged in parallel to each other side by side along the processing parallelisation axis (x) as a processing module;

with at least one card distribution device associated with the card transport system being arranged in the processing direction before and behind a processing module, each of said card distributing devices functioning to move cards along the processing parallelisation axis (x), and which is capable of receiving a card (K), accommodating said card or discharging said card to a processing station, respectively, from a card supply magazine or from another processing station after moving into a card receipt or a card discharge position, respectively.

2. The system according to claim 1, wherein there is a plurality of said processing stations with the shortest processing time.

3. The system according to claim 2, wherein the first number of processing stations with the longest processing time compared to the second number of processing stations with the shortest processing time corresponds to the ratio of the processing times multiplied by the number of processing stations with the shortest processing time rounded to the next higher integer number.

4. The system according to claim 3, wherein the card distribution device comprises a motor driven carriage which is movable along the processing parallelisation axis (x) either in an infinitely variable or a stepwise manner, with transport rollers (2C) for a card feed and the card discharge being rotatably supported on axes which are arranged perpendicularly to the processing sequence axis (y).

5. The system according to claim 1, wherein the first number of processing stations with the longest processing time compared to the second number of processing stations with the shortest processing time corresponds to the ratio of the processing times multiplied by the number of processing stations with the shortest processing time rounded to the next higher integer number.

6. The system according to claim 1, wherein the card distribution device comprises a motor driven carriage which is movable along the processing parallelisation axis (x) either in an infinitely variable or a stepwise manner, with transport rollers for a card feed and the card discharge being rotatably supported on axles which are arranged perpendicularly to the processing sequence axis (y).

7. The system according to claim 6, wherein there are at least three pairs of said transport rollers each of which comprises two transport rollers arranged one above the other and accommodating between them the cards (K) in a frictional engagement in the card transport plane (x, y), with one transport roller each of a transport roller pair being motor-driven.

8. The system according to claim 7, wherein a drive direction of the transport rollers is reversible.

9. The system according to claim 7, wherein the card distribution device includes a card receiving housing with at least one sensor which signals whether a fed-in card (K) has been properly received or discharged, respectively, and wherein the card distribution device can be moved along the processing parallelisation axis (x) only after an appropriate signal from said sensor.

10. The system according to claim 9, wherein the carriage of the card distribution device is mounted via a mounting plate immediately on a circulating motor-driven belt, which can be moved between two boundary positions.

11. The system according to claim 6, wherein a drive direction of the transport rollers is reversible.

12. The system according to claim 11, wherein the card distribution device includes a card receiving housing with at least one sensor which signals whether a fed-in card (K) has been properly received or discharged, respectively, and wherein the card distribution device can be moved along the processing parallelisation axis (x) only after an appropriate signal from said sensor.

13. The system according to claim 12, wherein a light barrier each is provided at a card leading edge side upstream of the transport rollers and at the card trailing edge downstream of the transport rollers, with the card leading edge side light barrier starting a drive of the transport rollers immediately after detection of a card transferred to the card distribution device and, after the card (K) has passed said card leading edge light barrier, a message being generated which enables the moving of the card distribution device along the processing parallelisation axis (x); and a signal being generated when the card has passed the card trailing edge side light barrier, which enables the moving of the card distribution device along the processing parallelisation axis (x).

14. The system according to claim 6, wherein the card distribution device includes a card receiving housing with at least one sensor which signals whether a fed-in card (K) has been properly received or discharged, respectively, and wherein the card distribution device can be moved along the processing parallelisation axis (x) only after an appropriate signal from said sensor.

15. The system according to claim 14, wherein a light barrier each is provided at a card leading edge side upstream of the transport rollers and at the card trailing edge downstream of the transport rollers, with the card leading edge side light barrier starting a drive of the transport rollers immediately after detection a card transferred to the card distribution device and, after the card (K) has passed said card leading edge light barrier, a message being generated which enables the moving of the card distribution device along the processing parallelisation axis (x); and a signal being generated when the card has passed the card trailing edge side light barrier, which enables the moving of the card distribution device along the processing parallelisation axis (x).

16. The system according to claim 15, wherein the card trailing edge side light barrier turns off the drive of the transport rollers immediately after the detection of a received card (K) if the card distribution device has not yet reached the intended discharge position.

17. The system according to claim 15, wherein the card receiving housing is provided at the card leading edge side and at the card trailing edge side with a card guide means each for guiding the cards on the card transport plane.

18. The system according to claim 14, wherein the card receiving housing is provided at the card leading edge side and at the card trailing edge side with a card guide means each for guiding the cards on the card transport plane.

19. The system according to claim 18, wherein the card receiving housing is provided at the card leading edge side and at the card trailing edge side with a card guide means each for guiding the cards on the card transport plane.

20. The system according to claim 18, wherein the card guide means is formed by two guide rollers which are arranged at a distance to each other, one above the other, the rotation axes of each extend parallel with the processing parallelisation axis (x), with the distance between the guide rollers, being larger than one and smaller than two card thickness.

21. The system according to claim 20, wherein the carriage of the card distribution device is mounted via a mounting plate immediately on a circulating motor-driven belt, which can be moved between two boundary positions.

22. The system according to claim 6, wherein the carriage of the card distribution device is mounted via a mounting plate immediately on a circulating motor-driven belt, which can be moved between two boundary positions.

23. The system according to claim 22, wherein said motor-driven belt is a toothed belt.

24. The system according to claim 6, wherein the carriage of the card distribution device is movably installed on at least one guide rail which is arranged in parallel to the processing parallelisation axis (x) with the carriage being connected with a circulating motor-driven belt which extends parallel to the guide rail to be moved between two boundary positions and movable with same.

25. The system according to claim 6, wherein the carriage of the card distribution device is movably installed on at least one guide rail which is arranged in parallel to the processing parallelisation axis (x) with the carriage being connected with two motor-driven traction cables which extend parallel to the guide rail.

26. The system according to claim 6, wherein the carriage of the card distribution device is movable by means of a motor-driven threaded spindle which is arranged parallel to the processing parallelisation axis (x).

27. The system according to claim 6, wherein two or more card supplying magazines are arranged adjacent to each other along the processing parallelisation axis (x).

28. The system according to claim 1, wherein two or more card supplying magazines are arranged adjacent to each other along the processing parallelisation axis (x).

29. The system according to claim 1, comprising at least one laser inscription station as the card body processing station.

30. The system according to claim 1, comprising three laser inscription stations as the card body processing stations, and ten chip and/or magnetic stripe processing stations.

31. The system according to claim 1, comprising at least one embossing station as the card body processing station.

32. The system according to claim 1, comprising at least one thermal transfer printer as the card body processing station.

33. The system according to claim 1, comprising at least one thermal sublimation printer as the card body processing station.

34. The system according to claim 1, comprising at least one ink jet printer as the card body processing station.

35. The system according to claim 1, comprising an image recognition station arranged in the processing sequence direction behind the last card body processing station for verifying the correctness and quality of the data/information applied on the card body.

36. The system according to claim 1, wherein at least one card supply magazine, one chip and/or magnetic stripe processing station and card body processing station comprising a laser station are arranged aligned to each other one after the other.

37. The system according to claim 1, wherein each processing module includes a parking and/or bypass station for cards.

38. The system according to claim 1, further comprising card storage and card reject magazines for accommodating the processing cards.

39. The system according to claim 1, further comprising an enveloping machine for the detachable fixing/packaging of the processed cards on/in a carrier.

* * * * *